United States Patent [19]
Goto et al.

[11] Patent Number: 5,323,530
[45] Date of Patent: Jun. 28, 1994

[54] APPARATUS FOR ASSEMBLING ROTORS

[75] Inventors: Susumu Goto; Shinichi Akiyama; Yoshihiro Fujita, all of Niigata, Japan

[73] Assignee: Mitsubishi Materials Corporation, Japan

[21] Appl. No.: 26,430

[22] Filed: Mar. 5, 1993

[30] Foreign Application Priority Data

Jul. 27, 1992 [JP] Japan .................. 4-199938

[51] Int. Cl.⁵ .............................. B23P 21/00
[52] U.S. Cl. .................... 29/771; 29/893.1; 29/240
[58] Field of Search ............ 29/893, 893.1, 240, 29/700, 771

[56] References Cited

U.S. PATENT DOCUMENTS 4,630,344 12/1986 Boyle et al. ............... 29/898.054
4,662,053  5/1987 Aceti et al. ................. 29/893.1

FOREIGN PATENT DOCUMENTS

125950 9/1980 Japan ..................... 29/771
155131 9/1983 Japan ..................... 29/240

Primary Examiner—P. W. Echols
Attorney, Agent, or Firm—Quarles & Brady

[57] ABSTRACT

An apparatus for automatically assembling an inner rotor and an outer rotor substantially applied to an inscribe-type gear pump. Described is the construction and the function of the apparatus for incorporating inner rotors into outer rotors in such a manner that a holding pin which is pressed into a central hole of inner rotor descends together with the inner rotor until the accompanying inner rotor is filled into outer rotor. While the holding pin is lowered together with inner rotor, it is rotated so that gear portions of both rotors can be aligned properly and engage.

10 Claims, 12 Drawing Sheets

APPARATUS FOR ASSEMBLING ROTORS

BACKGROUND OF THE INVENTION (a) Field of the Invention

The present invention relates to apparatus for assembling rotors for forming inscribe-type gear pump in such a manner as to incorporate an inner rotor having a gear portion around its outer periphery into an outer rotor having a gear portion around its inner periphery.

(b) Description of Prior Art

Figure 13:
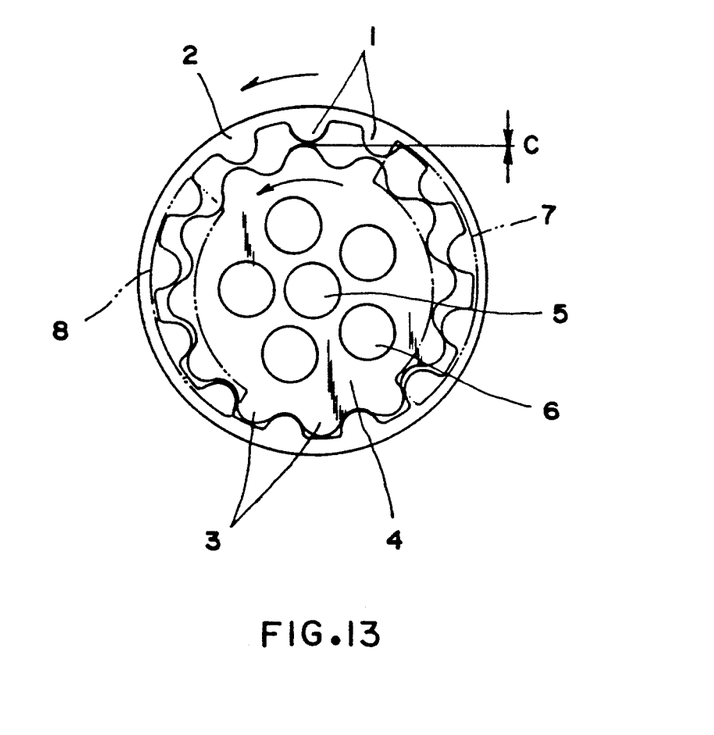
FIG. 13 is a top plan view showing an inscribe-type gear pump to be assembled by the present invention.

As shown in FIG. 13, an inscribe-type gear pump in non-crescent configuration has been conventionally formed in such a manner as to eccentrically incorporate an inner rotor 4 having a gear portion around its outer periphery into an outer rotor 2 having a gear portion 1 around its inner periphery. In the inner rotor 4 are provided a central hole 5 and peripheral holes 6 in cylindrical configuration to be connected to a driving axis. Said central hole 5 penetrates through the central axis portion of a inner rotor 4, and peripheral holes 6 are positioned around said central hole 5, surrounding said central hole 5 axially in parallel. Both an outer rotor 2 and an inner rotor 4 are incorporated into a casing having an inlet port 7 and an outlet port 8 respectively, with the former being opposite to the latter on a diameter passing through eccentric axes of both rotors. The rotation drive of said inner rotor 4 allows said outer rotor 2 to rotate, so that oil sucked from an inlet port 7 is delivered to an outlet port 8, passing through the space between said outer rotor 2 and said inner rotor 4. Both rotors are manufactured, for instance, by compressing powdered material mainly composed of metal to be molded, and thereafter, heating and sintering it.

In the past, outer rotors 2 and inner rotors 4 have been shipped separately. Accordingly, as relatively a large packing capacity is inevitably needed, and both rotors are finally to be used with one into the other, so that both rotors have come to be shipped in said incorporated state after having manufactured outer and inner rotors respectively. In such cases, each inner rotor 4 has been conventionally incorporated one by one into each outer rotor 2 in a manual manner, which takes time, is laborious lowers efficiency and increases cost. A prior device is disclosed for overcoming this problem, such as grasping means for assembling parts having openings therein, as shown in U.S. Pat. No. 4,630,344, which discloses apparatus for assembling different size parts in a vertical assembly, including a pair of fingers attached to and extending from the gripper of a manipulator in parallel relationship and movable toward and away from one another under control of the gripper. However, this patent cannot be utilized to assemble rotors that require rotating means to engage.

Therefore, rotor assembling apparatus for automatically incorporating an outer rotor 2 into an inner rotor 4 is to be invented. The inventor is inevitably to be confronted with the problem of how to engage a gear portion 3 of an inner rotor 4 with a gear portion 1 of an outer rotor 2. One solution is to incorporate said inner rotor 4 into said outer rotor 2 after having located said inner rotor 4 in an appropriate position on the periphery, by means of an optical sensor to detect the appropriate position of the gear portion 3 of said inner rotor 4. But in the above-mentioned method, the installed position of said sensor will be limited, so that such rotor assembling apparatus will be inevitably too expensive in addition to its complex construction. Furthermore, as the largest clearance "c" between the top-most vertices of said gear portions 1,3 is formed approximately 0.05 mm long to prevent oil leakage, only a little error of positioning can cause the interference of said gear portion 1 with said gear portion 3. Consequently, an inner rotor 4 cannot be incorporated into an outer rotor 2.

SUMMARY OF THE INVENTION

Briefly, the present invention relates to rotor assembling apparatus for automatically assembling inner rotors and outer rotors such as those utilized in inscribe-type gear pumps. The apparatus comprises outer rotor holding means, inner rotor holding means, inner rotor rotating means, and shifting means for shifting the inner rotor rotating means. An elastically deformable holding pin included in the inner rotor holding means is pressed into a central hole of inner rotor in order that the holding pin may be lowered with the inner rotor until the accompanying inner rotor is fitted into outer rotor. While the holding pin is lowered together with the inner rotor, it is rotated so that the gear portions of both rotors can be aligned properly and engage.

It is a primary object of the present invention to provide an apparatus for assembling inner and outer rotors in an inscribe-type gear pump.

Another object of the present invention is to provide an assembling apparatus of high efficiency and low cost.

A further object of the present invention is to provide an apparatus for automatically assembling rotors.

BRIEF DESCRIPTION OF THE DRAWINGS

Other objects, features, and advantages of the invention will be apparent to those skilled in the art from the following detailed description of the present invention, wherein reference is made to the accompanying drawings, of which.

DETAILED DESCRIPTION OF THE PREFERRED EMBODIMENT

With reference to the drawings, one of the embodiments of the present invention will be described hereinafter.

Figure 1:
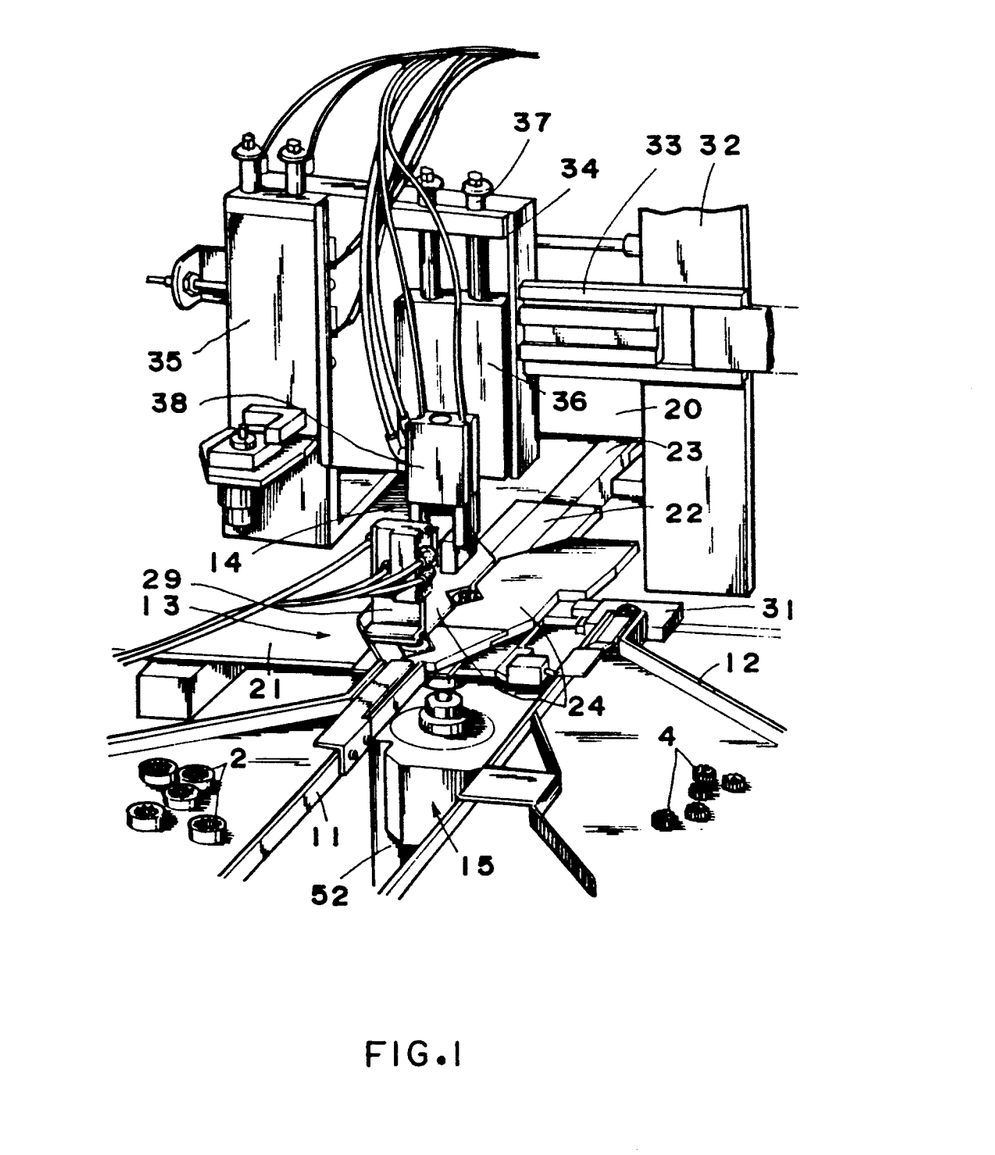
FIG. 1 is a perspective view showing one of the embodiments of assembling apparatuses of the present invention.
Figure 2:
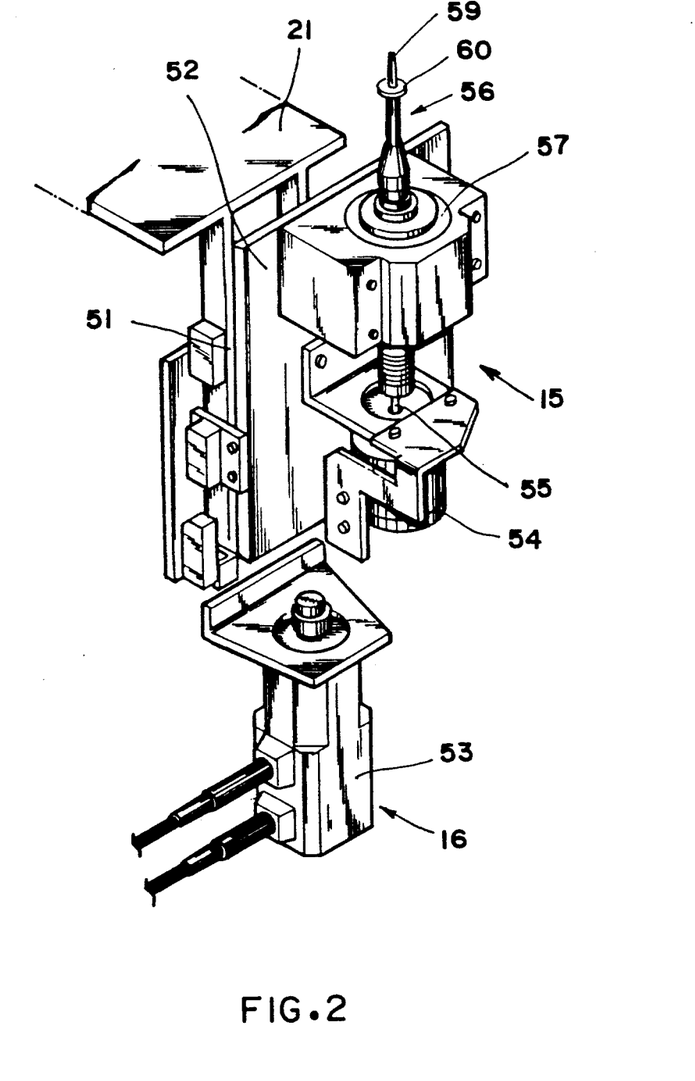
FIG. 2 is a perspective view showing inner rotor rotating means and its vertical shifting means of the present invention.

What is assembled is, as described above, rotors 2,4 of an inscribe-type gear pump. Said rotors assembling apparatus, as shown in FIGS. 1,2, is provided with: an inline feeder 11 applied to outer rotors, an inulin feeder 12 applied to inner rotors, outer rotor holding means 13 for removably holding outer rotors 2 in predetermined positions and for shifting said outer rotors 2 which are supplied from said inline feeder 11, inner rotor holding means 14 for removably holding inner rotors 4 in a predetermined position and for shifting said inner rotors 4 which are supplied from said inline feeder 12, inner rotor rotating means 15 for rotating said inner rotors 4, and vertically shifting means 16 for vertically shifting said inner rotor rotating means. In this assembling apparatus, the axes of rotors 2,4 are always vertical.

Hereinafter, the structure of said outer rotor holding means 13 is explained with reference to FIGS. 3,4

Onto a horizontal base pad 21 is horizontally secured rotor sliding plate 22 in a fore and aft manner. Said rotor sliding plate 22, on the surface of which rotors 2,4 slide back and forth, is provided with three predetermined positions "a,b,c" equally spaced. An outlet portion of said inline feeder 11 applied to outer rotors is connected to a back end of said rotor sliding plate 22 so that outer rotors may be supplied one by one from said inline feeder 11 to said predetermined position "a". At the front portion of said rotor sliding plate 22 is provided a belt conveyer 23 in a fore and aft manner. Said belt conveyer 23 conveys assembled rotors 2,4 forward and into a chute 20 at one end of said belt conveyer 23. And on said rotor sliding plate 22 is provided a chuck 24 for removably holding and forwardly shifting said rotors 2,4. Said chuck 24 has a pair of chuck plates that are opened and closed laterally by means of a fluid-pressure cylinder device (not shown) provided in the lower part of a base 21 and is reciprocated back and forth by means of another fluid-pressure cylinder device (not shown). When the chuck 24 is opened, the clearance between the pair of chuck plates is formed slightly larger than the outside diameter of an outer rotor. And each stroke of lengthwise movement of said chuck 24 is equal to the each pitch of said predetermined positions "a,b,c". Outer rotor holding portions 25,26 and outer rotor pushing-out portion 27 in said chuck 24 are formed in the same order as said predetermined positions "a,b,c". When said chuck 24 is closed, both of said outer rotor holding portions 25,26 form square apertures which circumscribe the outer periphery of outer rotor 2, and outer rotor pushing-out portion 27 is formed in approximately V-configuration, that is to say, a portion tapering backward. The back end portion 24a of said chuck 24 provided with said outer rotor holding portion 25 is composed of plastic, and the other portions of said chuck 24 are composed of metal. And in said outer rotor holding portion 26 located in the middle predetermined position is axially mounted rollers 28 circumscribing and holding the outer periphery of said rotors 2. Further, as shown in FIG. 1, above the predetermined position "a" on said rotor sliding plate 22 is provided a sensor in order to detect whether or not outer rotors are fed into the predetermined position "a".

Hereinafter, the structure of said inner rotor holding means 14 will be explained mainly with reference to FIGS. 5 to 9.

On said base pad 21 is secured a pedestal 31 for inner rotors, to which is connected an outlet port of said inline feeder 12 applied to inner rotors, so that inner rotors are supplied one by one from said inline feeder 12 on said pedestal 31. And said pedestal 31 for inner rotors 2 is positioned on the right side of the predetermined position "b" on said rotor sliding plate 22. Above said base pad 21 is secured a lateral rail 33 supported by a pole 32 and on said lateral rail 33 is slidably mounted a lateral slider 34, which is driven by a fluid-pressure cylinder 35. Behind said lateral slider 34 is slidably mounted a vertical slider 36 which slides up and down, and is driven by a fluid-pressure cylinder 37. Further, in the lower part of the back of said vertical slider 36 is provided a chuck device 38 removably holding inner rotors 4. Said chuck device 38 is composed of laterally paired chuck plates 39 which are laterally opened and closed by the driving force of a pressure-fluid cylinder device. At the lower end of said chuck 39, that is to say, a portion abutting on inner rotors 4, is a gripping portion 40 comprised of plastic. In the lower tips of said gripping portion 40 are cut out recesses 41, so that said laterally paired chuck plates 39 ma be fitted in the upper portions of inner rotors 4. Inner rotors 4, which are held by said chuck plates 39 in such a manner, are laterally shifted from above said pedestal 31 to a position approximately in coaxial alignment over outer rotors 2 held in the predetermined position "b" of said rotor sliding plate 22. Correctly speaking, axes of both rotors 2,4 are located slightly apart, corresponding to the eccentric distance of the assembled rotors. And on both sides of said pedestal 31 is provided an optical sensor 42 in order to detect the feeding of inner rotors 4 into position.

Hereinafter, the structures of said inner rotor rotating means 15 and its vertically shifting means 16 are explained mainly with reference to FIG. 2 and FIGS. 10 to 12.

As shown in FIG. 2, below said base 21 is fixed a vertical rail 51, to which a vertical slider 52 is slidably mounted. Said vertical slider 52 is driven by a fluid-pressure cylinder device 53. This is how said vertical shifting means 16 is constructed.

Figure 10:
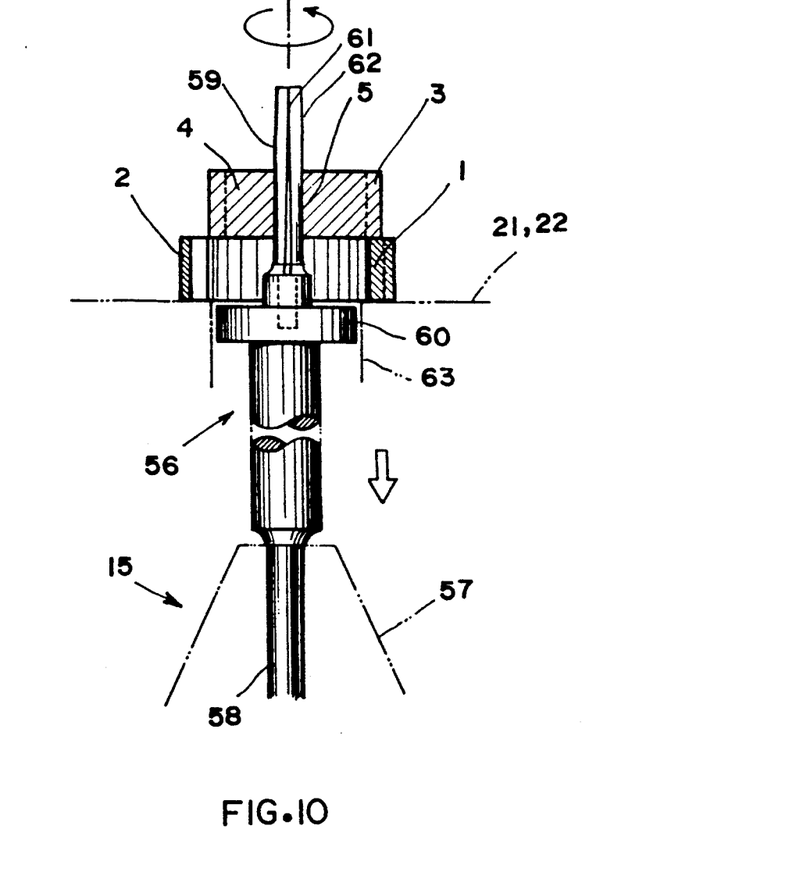
FIG. 10 is a side view showing the operation of inner rotor rotating means of the present invention.
Figure 11:
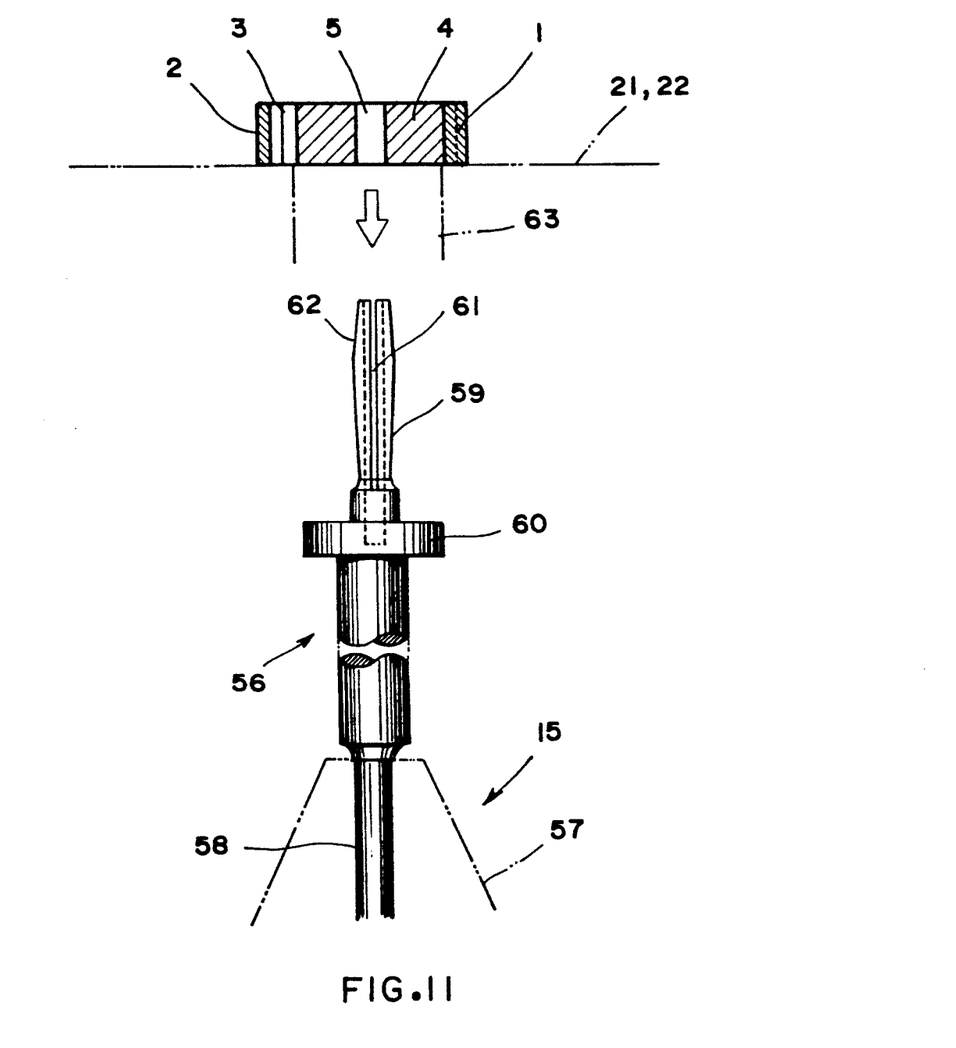
FIG. 11 is a side view also showing the operation of inner rotor rotating means of the present invention.
Figure 12:
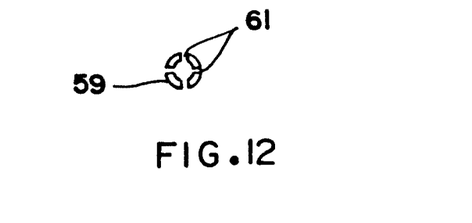
FIG. 12 is a top plan view showing a holding pin of the present invention.

Further, to said vertical slider 52 is fixed an electric motor 54 as rotating drive source. And to the rotation output shaft 55 protruding above said electric motor 54 is vertically and firmly connected in series a holding pin 56 made of hardened steel, by means of a coupling device 57. Especially as shown in FIGS. 10 and 11, said holding pin 56 is positioned coaxially with respect to a central hole 5 of an inner rotor 4 which is held above said predetermined position "b", by means of said inner rotor holding means 14. The lower end of said holding pin 56 is a first axis portion 58 coupled by said coupling device 57, and the upper end of said holding pin 56 is a holding axis portion 59, below which is provided a collar 60. Said holding axis portion 59 is, as shown in FIG. 12, cylindrical and is provided with radial slits 61 extending radially and in parallel with said axis, up to the upper tip of said holding pin 56 so that said holding axis portion 59 will be deformable in the radial direction. In addition to the above-mentioned features, said holding-axis portion 59 has a tapered portion 62 in the upper part, and a anti-tapered portion in the lower part. The holding-axis portion 59 with the above-mentioned features is thrust upward and removably pressed from below into a central hole 5 of an inner rotor 4 held above said predetermined position "b". Being pressed into said central hole 5, said holding-axis portion 59 and said inner rotor 4 can be fixed to some extent, so that said inner rotor 4 can be rotated by the drive force of said electric motor 54. This is because the maximum diameter of said holding axis portion 59 is formed slightly larger than that of a central hole 5 of an inner rotor 4, while the upper diameter of said tapered portion 62 is formed slightly smaller than that of a central hole 5 of an inner rotor 4. Additionally, in said predetermined position "b" on both said base 21 and said rotor sliding plate 22 are provided penetrated holes 63 through which said holding pin 56 passes. This is how said inner rotor rotating means 15 is constructed.

Hereinafter, the operation of said embodiment will be explained. In assembling outer rotors 2 and inner rotors 4, a number of outer rotors 2 manufactured in the same process are fed in an inline feeder 11 applied to outer rotors, while a number of inner rotors 4 manufactured in the same process are fed in an inline feeder 12 applied to inner rotors. Inline feeders 11,12 supply outer rotors 2 one by one to the predetermined position "a" on said rotor sliding plate 22, and inner rotors 4 are placed one by one onto a pedestal 31. The following is an explanation of the operation of outer rotor holding means 13. Said chuck 24 is moved forward while the chuck plates are open, as shown in dotted line in FIG. 3, until it arrives at a progress position shown in full line in FIG. 3, where said chuck plates are closed. Thereafter, said chuck 24 is moved backward while said chuck plates are closed as shown in full line in FIG. 4, until it arrives at a retreat position shown in FIG. 4, where said chuck plates are opened again as shown in dotted line in FIG. 4, and then begins to progress again. Such an operation process as described above is repeated.

Figure 3:
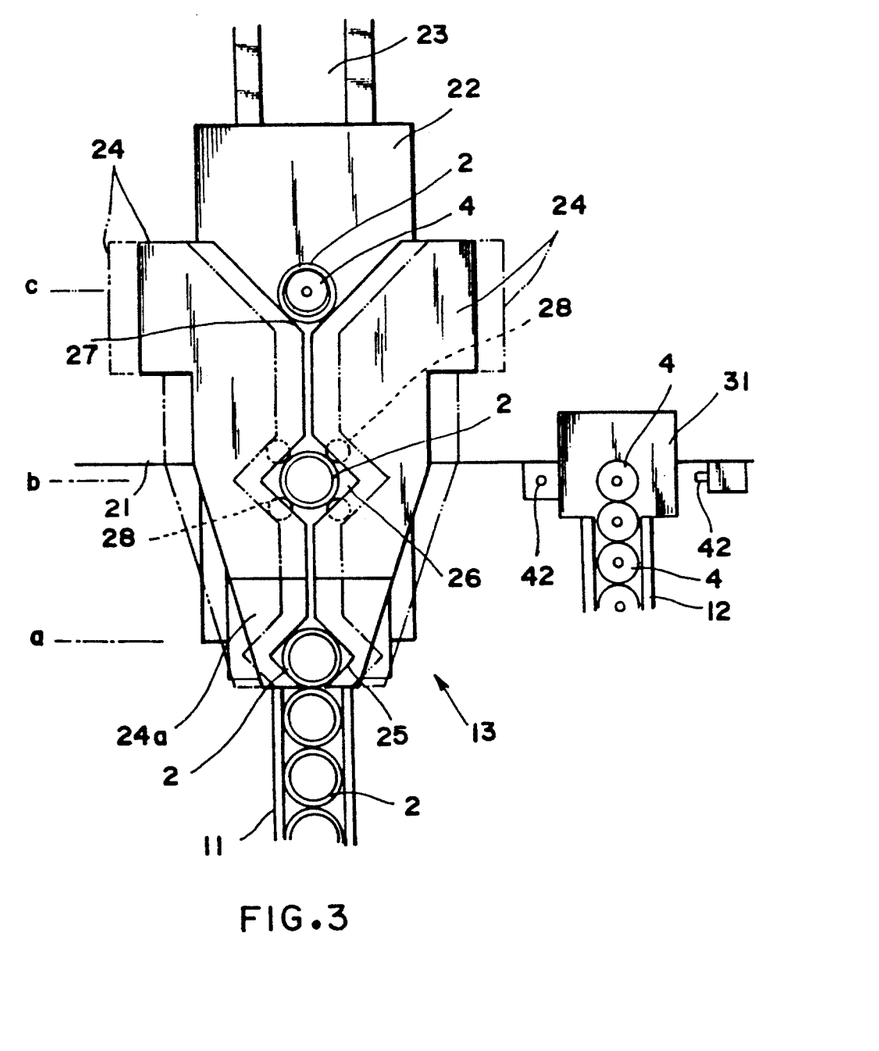
FIG. 3 is a top plan view showing the operation of outer rotor holding means of the present invention.
Figure 4:
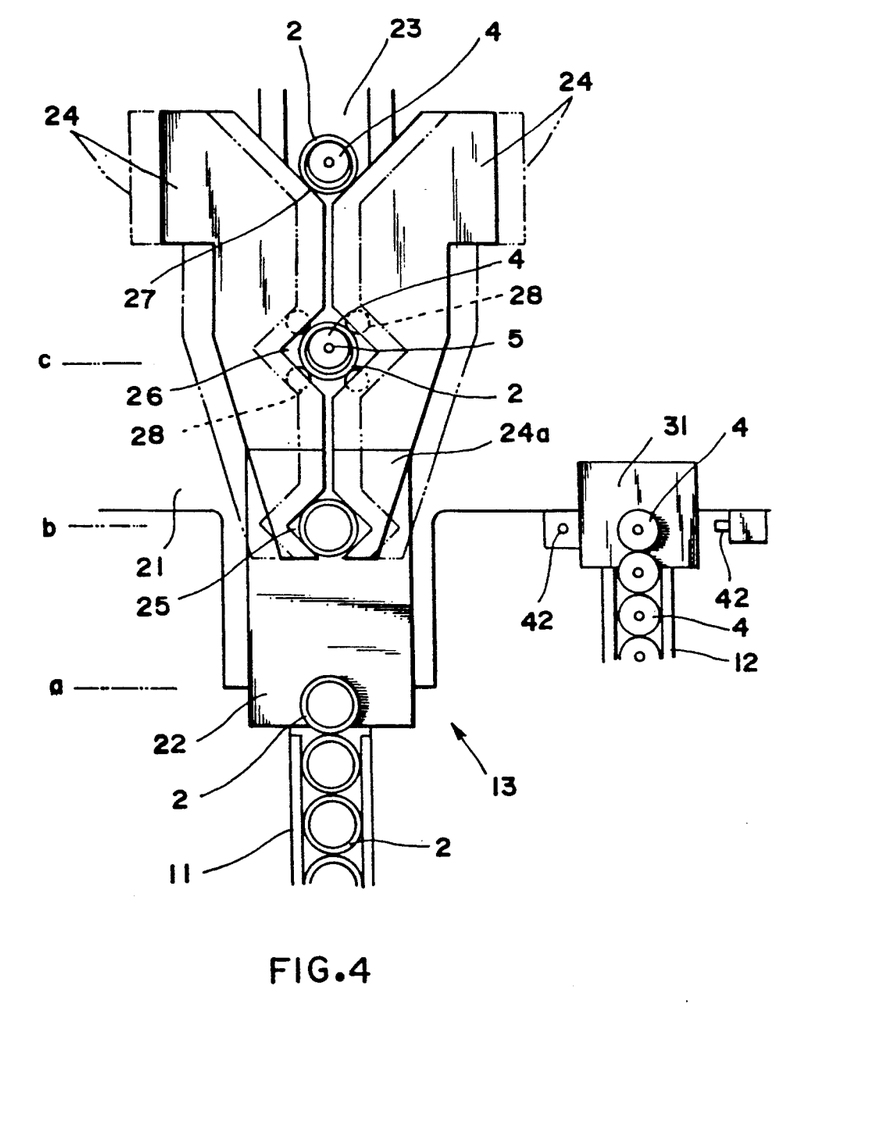
FIG. 4 is a top plan view also showing the operation of outer rotor holding means of the present invention.

In said progress position shown in FIG. 3, outer rotor holding portions 25, 26 and outer rotor pushing-out portion 27 are positioned, respectively corresponding to the predetermined positions "a,b,c" on said rotor sliding plate 22. On the other hand, in said retreat position shown in FIG. 4, said outer rotor holding portions 25,26 are positioned respectively in the predetermined positions "b,c" on said rotor sliding plate 22, and said outer rotor pushing-out portion 27 is positioned above the back end of the belt conveyer 23.

Now, for the sake of more detailed explanation, one outer rotor 2 will be taken for example. With said one outer rotor 2 being detected in the predetermined position "a" by a sensor 29, the progress chuck 24 is closed, as shown in full line in FIG. 3, so that said outer rotor holding portion 25 located on the back side of said chuck 24 will grip said outer rotor 2 in the predetermined position "a". Thereafter, said chuck 24 is moved backward with said outer rotor 2 gripped, until the gripped outer rotor 2 arrives at the predetermined position "b", where said chuck 24 is opened and moved forward, with said outer rotor 2 left there. When said chuck 24 comes to said progress position again, said chuck 24 is closed again, so that said outer rotor 2 left in the predetermined position "b" can be gripped again by said outer rotor holding portion 26. At this time, as four rollers 28 located in said outer rotor holding portion 26 surround and clamp said outer rotor 2 as shown in FIG. 3, so that the horizontal level of said outer rotor 2 is assured. With one outer rotor 2 held in above-described state, an inner rotor 4 is laterally shifted above the outer rotor 2 by means of inner rotor holding means 14 in order to be incorporated into the outer rotor 2 by means of both inner rotor rotating means 15 and its vertical shifting means 16. Thereafter, the backward movement of said chuck 24 with the chuck plates closed allows said incorporated rotors 2,4 to be carried to the predetermined position "c". Thereafter, said chuck 24 is opened and is moved forward with said incorporated rotors 2,4 left in the predetermined position "c" until said chuck 24 arrives at the progress position. The next backward movement of said chuck 24 with the chuck plates closed allows said incorporated rotors 2,4 to be pushed out on said belt conveyer 23 by outer rotor pushing-out portion 27 in order to be carried into chute 20. As above described, one outer rotor has been taken for example for the sake of more detailed explanation. To explain it briefly, every time said chuck 24 moves backward, three outer rotors 2 and two inner rotors 4 are carried one pitch more backwardly.

Hereinafter, the operation of inner rotor holding means 14 will be described.

Figure 5:
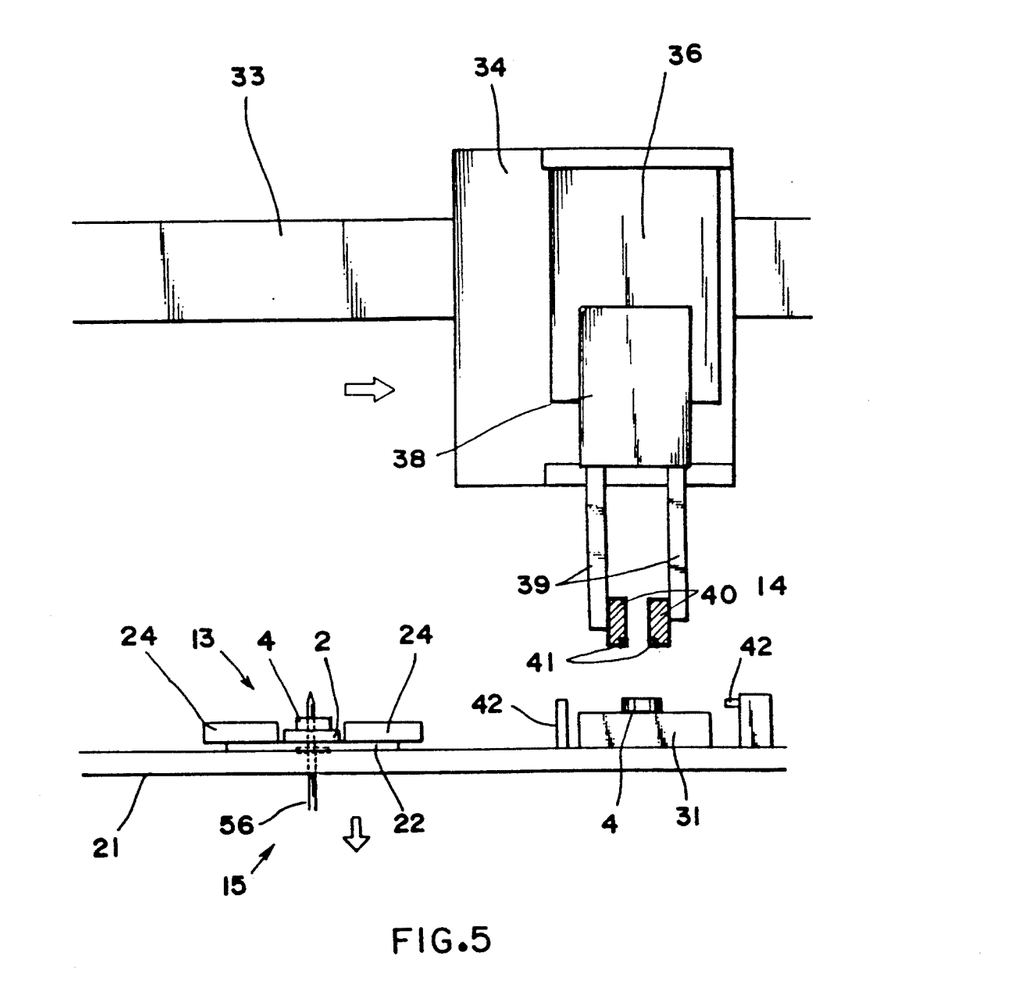
FIG. 5 is a front elevation showing the operation of inner rotor holding means of the present invention.
Figure 6:
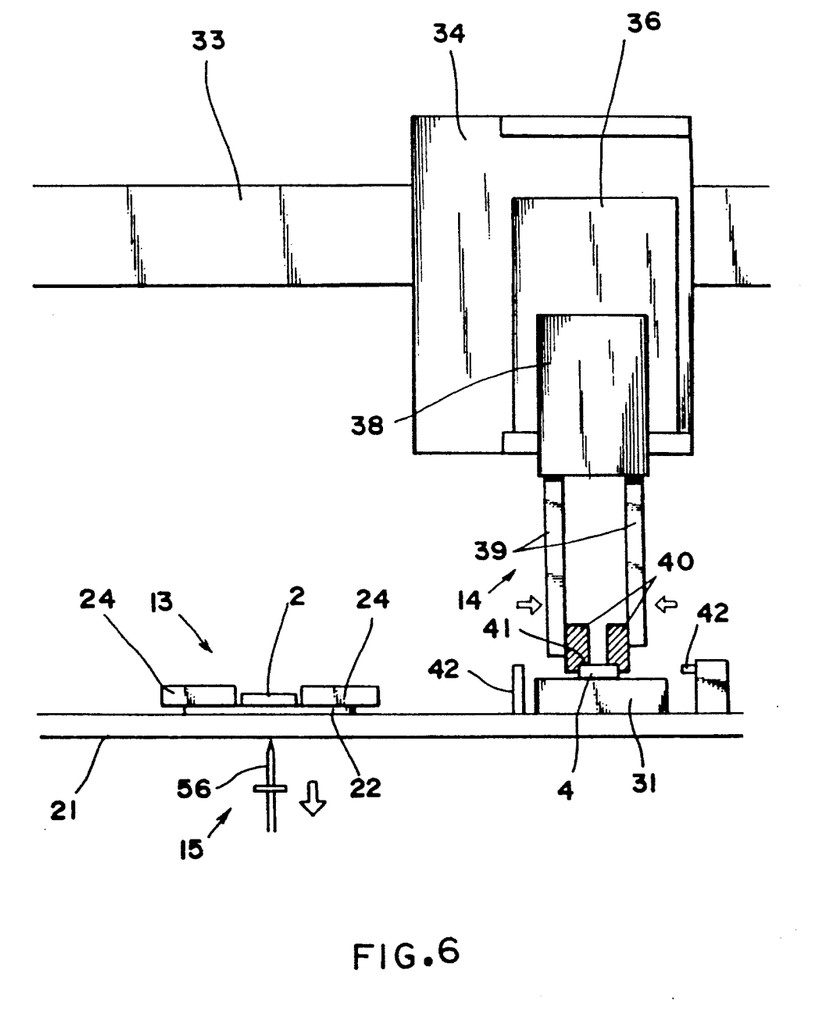
FIG. 6 is a front elevation also showing the operation of inner rotor holding means of the present invention.
Figure 7:
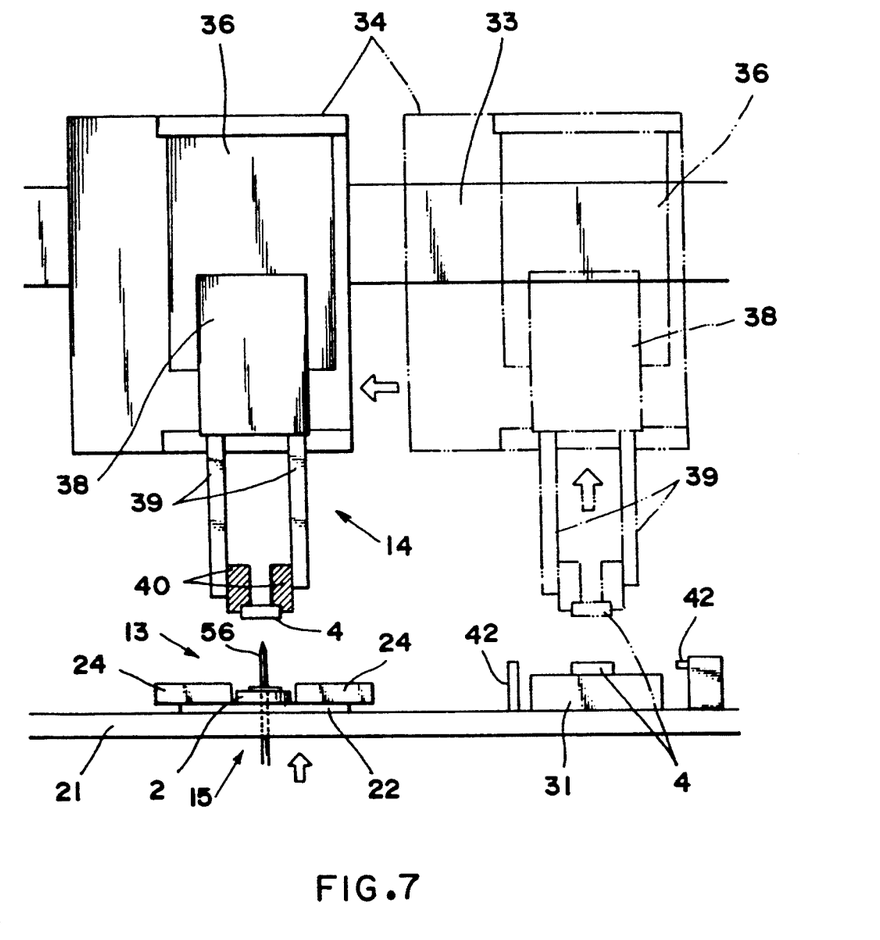
FIG. 7 is a front elevation also showing the operation of inner rotor holding means of the present invention.
Figure 8:
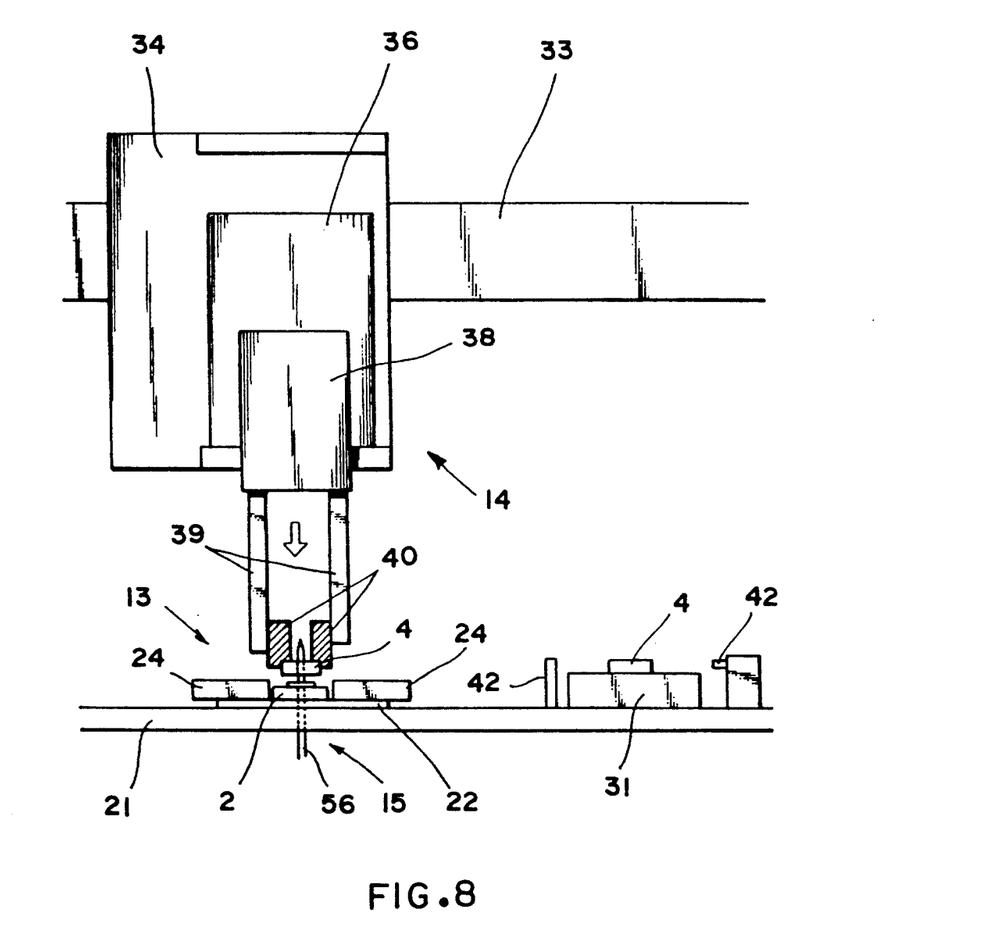
FIG. 8 is a front elevation also showing the operation of inner rotor holding means of the present invention.
Figure 9:
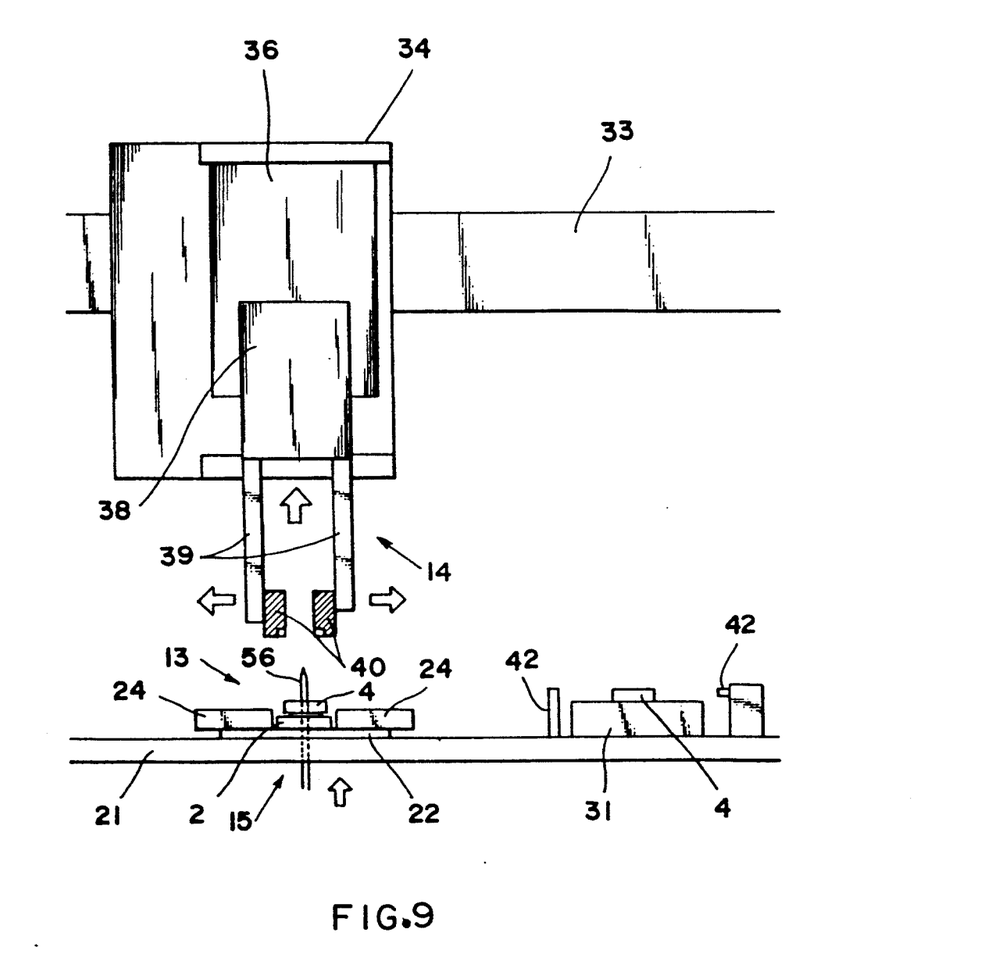
FIG. 9 is a front elevation also showing the operation of inner rotor holding means of the present invention.

As shown in FIG. 5, a lateral slider 34 slides toward the right direction along a lateral rail 33 in order to hold an inner rotor supplied on a pedestal 31 by an inline feeder 12 applied to inner rotors. With an inner rotor 4 being detected on said pedestal 31 by a sensor 42, a vertical slider 36 slidably mounted on said lateral slider 34 slides down to grip an inner rotor 4 fed on said pedestal 31. After the chuck 39 are closed to grip the inner rotor 4, said vertical slider slides up with said chuck 39 gripping the inner rotor 4, as shown in FIG. 7 in dashed line. And then, said lateral slider 34 slides toward the left direction, as shown in full line in FIG. 7, until said inner rotor 4 gripped by the chuck 39 is positioned approximately coaxially over said outer rotor 2 held in the position "b" by the outer rotor holding means 26 of said chuck 24. Additionally, after a holding pin 56 of an inner rotor rotating means 15 is thrust upward, said vertical slider 36 slides downward, as shown in FIG. 8, so that a holding-axis portion 59 of said holding pin 56 will be pressed into a central hole 5 of the inner rotor 4. Thereafter, as shown in FIG. 9, said vertical slider slides upward after having opened its chuck 39 and released the inner rotor 4. And then, as shown in FIG. 5, said lateral slider 34 slides back toward the right direction in order to repeat the above-described process. What is important here is that the operations of both outer rotor holding means 13 and inner rotor holding means 14 are so synchronized that just when an empty outer rotor 2 is held in said position "b" by the outer rotor holding portion 26, said inner rotor 4 may be carried above said empty outer rotor 2.

Hereinafter are explained the operations of inner rotor rotating means 15 and its vertical shifting means 16. As described above and shown in FIG. 7, a vertical slider followed by a holding pin 56 is lifted up by the driving force of a cylinder device 53, with inner rotor holding means 14 holding an inner rotor 4 above an empty outer rotor 2 located in the position "b". Further, as shown in FIG. 8, an inner rotor 4 held by inner rotor holding means 14 descends so that said holding-axis portion 59 of the holding pin 56 may be coaxially pressed into a central hole 5 of the inner rotor 4. At this time, the tapered portion 62 at the upper end of said holding-axis portion 59 allows said holding-axis portion 59 to be smoothly inserted into the central hole 5 of the inner rotor 4 Additionally, as said holding-axis portion 59 is provided with a cross slit 61 and is elastically deformable in the radial direction, said holding-axis portion 59 firmly holds the inner rotors 4, though said holding-axis portion 59 is smoothly insertable as described above. This means that said holding-axis portion 59 shrinks its diameter elastically when it is inserted into the central hole 5. After the holding-axis portion 59 is inserted into the central hole 5 in above-described manner, inner rotor holding means 14 will release the inner rotor 4, which still remains held by said holding-axis portion 59, as shown in FIG. 9. Thereafter, said holding-axis portion 59 is lowered by the drive force of the cylinder device 53, while it is rotated by the electric motor 54 simultaneously. The inner rotor 4, at this time, is lowered until it meets the upper end of the outer rotor 2 and is rotating together with the holding-axis portion 59.

The problem is that while the gear portions 1,3 of both rotors 2,4 are not aligned, and consequently, not engaging, the inner rotor 4 cannot be incorporated into the outer rotor 2, as the interference of one rotor with the other rotor allows the inner rotor 4 to be lowered only to the upper end of the outer rotor 2. But as described above, said holding-axis portion 59 is elastically deformable in the radial direction, so that it is removable and able to be lowered alone without being influenced by said interference. What is important here is that said holding-axis portion 59 is rotating and is tightly abutting on the peripheral section of the central hole 5, therefore, the inner rotor 4 is able to be rotated together with the holding pin 56. Accordingly, as shown in FIG. 11, the gear portions 1,3 of both rotors are to be aligned properly and engage each other in due course, so that the inner rotor 4 is lowered to the surface of the rotor sliding plate 22 until said inner rotor meets there. This is how the inner rotor 4 is incorporated into the outer rotor 2 automatically.

Additionally, after the inner rotor 4 starts to be incorporated into the outer rotor 2, the inner rotor 4 stops rotating and only the holding pin 56 is rotated alone. Consequently, the holding-axis portion 59 passes through the central hole 5 of the inner rotor 4 and returns to the initial position. It is to be noted that even after the holding-axis portion 59 passes through, prior to the inner rotor being perfectly incorporated into the outer rotor 2, the inner rotor 4 is able to be lowered by its self-weight. And both rotors 2,4 assembled in this manner are carried forward by said chuck 24.

As described above, the structure of said embodiment permits an outer rotor 2 and an inner rotor 4 to be applied to an inscribe-type gear pump to be automatically assembled efficiently, without taking laborious work and time, which will result in lower costs. Additionally, as said holding pin 56 is pressed into the central hole 5 of the inner rotor 4 and is lowered toward the outer rotor 2, that is, the downward direction with the inner rotor 4 rotated together, the gear portions 1,3 of both rotors 2,4 approximately coaxially positioned are aligned and engage each other.

And just when both rotors 2,4 engage properly, the inner rotor 4 can be fitted into the outer rotor 2. Therefore, a rotor assembling apparatus with this simple structure assures that the inner rotor 4 can be incorporated into the outer rotor 2.

As compared with a prior device that locates the inner rotors 4 in the proper position of its periphery with reference to detection by a sensor provided in order to detect the position of the gear portion 3, the present assembling device can be constructed more simply and less expensively and can assure that the assembly mistakes are little, if any. Furthermore, as the holding-axis portion 59 of the holding pin 56 is provided with slits 61 and the tapered portions at its both ends and is elastically deformable in the radial direction, so that the holding-axis portion 59 can be easily and smoothly inserted into and removed from the central hole 5 of the inner rotor 4, while the holding-axis portion 59 can firmly hold the inner rotor 4. The holding pin 59 can be prevented thereby from uselessly idling with respect to the inner rotor 4 so that the inner rotor 4 can be incorporated into the outer rotor 2 without mistakes.

It is understood by those skilled in the art that the foregoing description is a preferred embodiment of the disclosed apparatus and that various changes and modifications may be made to the invention without departing from the sprit and scope thereof.

For example, the number and the configuration of the gear portions of rotors are not limited to those shown in FIG. 13. Neither are the detailed structures of each said means, nor the detailed process of manufacturing. For example, a holding pin 56 may be inserted into a central hole 5 of the inner rotor 4 after the inner rotor 4 is lowered above an empty outer rotor 2 located in the predetermined position "b".

We claim:

1. An apparatus for incorporating an inner rotor having a gear portion around its outer periphery and a central hole provided on the central axis into an outer rotor having a gear portion around its inner periphery, comprising:
   (1) outer rotor holding means for removably holding said outer rotor in at least one predetermined position,
   (2) inner rotor holding means for removably holding said inner rotor approximately coaxially with respect to said outer rotor positioned by said outer rotor holding means,
   (3) inner rotor rotating means provided with a holding pin removably pressed into central hole of said inner rotor held by said inner rotor holding means, and provided with a rotating drive source which rotates said holding pin,
   (4) shifting means for shifting said inner rotor rotating means along the axis of said outer rotor.

2. An apparatus according to claim 1, wherein said holding pin is provided with radial slits and elastically deformable in the radial direction.

3. An apparatus according to claim 2, wherein said holding axis portion of said holding pin is so formed that it tapers toward both ends.

4. An apparatus according to claim 1, wherein an inscribe-type gear pump is formed by incorporating said inner rotor into said outer rotor.

5. An apparatus according to claim 1, wherein said outer rotor holding means comprises:
   (1) a rotor sliding plate,
   (2) a chuck opening and closing laterally and reciprocating back and forth,
   (3) outer rotor holding portions and an outer rotor pushing-out portion provided in said chuck corresponding to three respective positions in which the outer rotor is held.

6. An apparatus according to claim 5, wherein an optical sensor is provided above said rotor sliding plate in order to detect the feeding of the outer rotors.

7. An apparatus according to claim 1, wherein said inner rotor holding means is comprised of:

(1) a holding pin, (2) a laterally paired chuck fixed in the lower part of a vertical slider slidably mounted in a lateral slider.

8. An apparatus according to claim 7, wherein an optical sensor is provided on said inner rotor holder in order to detect the feeding of the inner rotors.

9. An apparatus according to claim 1, wherein said inner rotor rotating means is comprised of:

(1) a motor provided for a vertical slider, (2) a holding axis portion of said holding pin connected to a rotation shaft of said motor, said rotation shaft protruding upward from said motor.

10. An apparatus according to claim 1, wherein said shifting means for shifting said inner rotor rotating means along the axis of said outer rotor is a vertical slider driven by a cylinder device.

* * * * *